(No Model.)
A. WEISENHORN.
VEHICLE BRAKE.
No. 443,449. Patented Dec. 23, 1890.
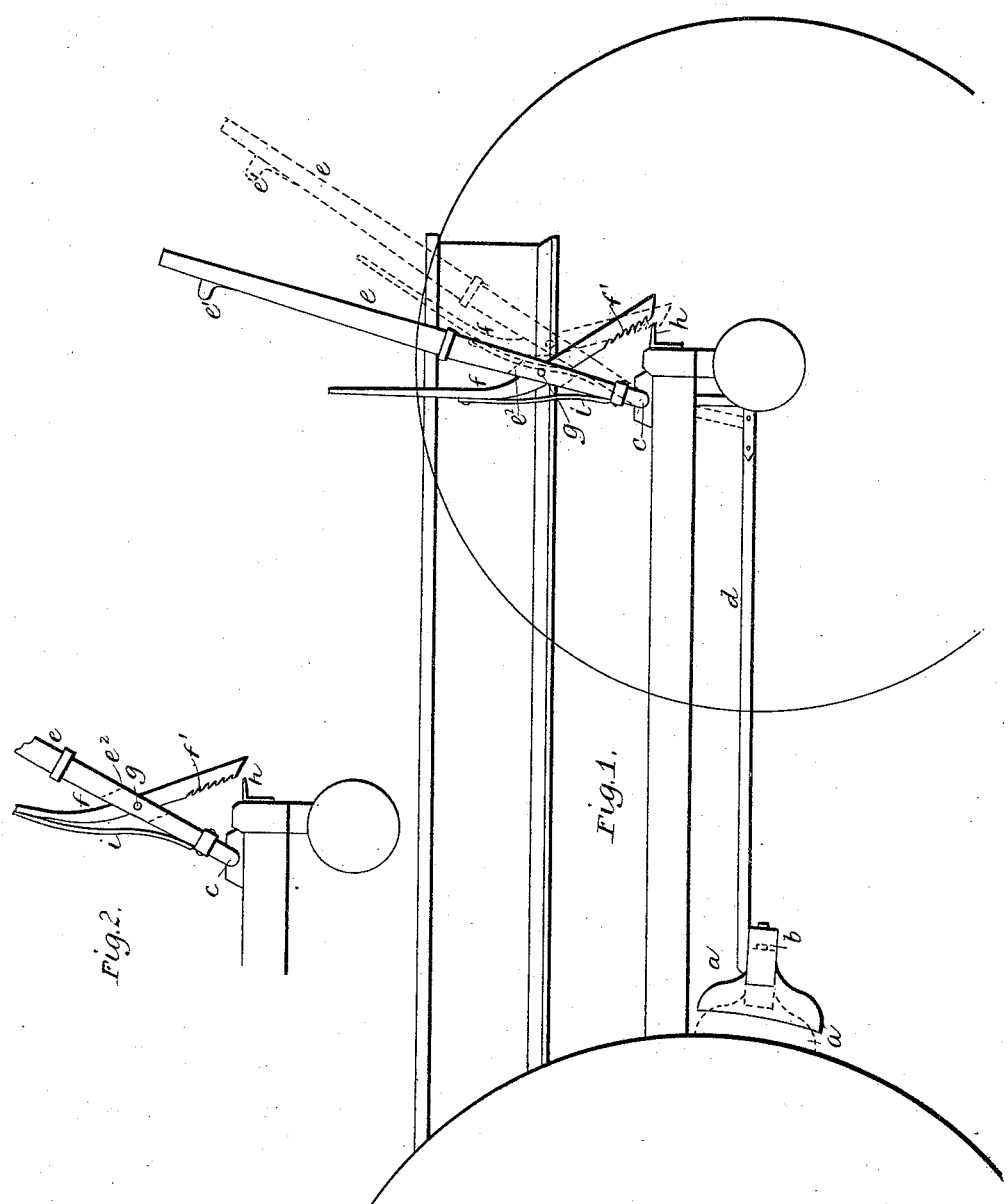
WITNESSES:
INVENTOR
August Weisenhorn
BY
his ATTORNEY.

UNITED STATES PATENT OFFICE.

AUGUST WEISENHORN, OF HELENA, MONTANA.

VEHICLE-BRAKE.

SPECIFICATION forming part of Letters Patent No. 443,449, dated December 23, 1890.

Application filed July 26, 1890. Serial No. 359,974. (No model.)

*To all whom it may concern:*

Be it known that I, AUGUST WEISENHORN, a citizen of the United States, residing at Helena, in the county of Lewis and Clarke and State of Montana, have invented certain new and useful Improvements in Vehicle-Brakes; and I do hereby declare the following to be a full, clear, and exact description of the invention, such as will enable others skilled in the art to which it appertains to make and use the same.

My invention relates to brakes for carriages and wagons, and is especially directed to devices for holding the brake when the same shall have been applied to stop or check the vehicle; and it consists in certain new and novel features of construction and operation, all of which will be hereinafter fully set forth in the following description, taken in connection with the accompanying drawings, in which—

Figure 1 shows enough of a vehicle with my invention applied thereto to illustrate the construction and operation of the devices, the different positions being indicated by means of full lines and dotted lines; Fig. 2, a detail enlarged of the device with some of its connections.

My invention may be applied to any class of vehicles, and the brake may be of any description in which the force comes directly upon the lever.

In the drawings, I have shown a brake of ordinary construction, and which consists, generally, of the shoes $a$ $a$ and their connecting-bar $b$, which is operated by means of the rock-shaft $c$, rods $d$, and lever $e$, this lever being provided with the toe-piece $e'$ and adapted to be operated by foot-power.

$f$ is a lever, which passes through a slot $e^2$ in the lever $e$, and is pivoted thereto by means of the bolt or pin $g$. The lever $f$ is provided at its lower end with rack-teeth $f'$, which are adapted to engage the catch $h$ on the forward part of the frame. A spring $i$ is connected to the two levers, as shown, and serves to keep the rack and catch normally out of engagement.

The operation is as follows: When it is desired to apply the brake, the levers are pressed downward until they assume the position shown in full lines in Fig. 1. The rack being in engagement with the catch the full force or pressure of the brake-lever comes directly upon the lower or racked portion of the lever $f$ and effectually locks the brake-lever in this position. All the resistance now offered to the foot of the operator is that of the spring $i$, which, when released, disengages the rack and catch and shifts the pressure of the brake-lever to the foot of the operator. When the power is taken off the brake-lever, the parts return to their normal position, indicated by the dotted lines in Fig. 1.

I claim—

The combination, with a brake-lever, of an auxiliary lever pivoted thereto and having a rack on its lower end, a catch on the forward part of the frame adapted to engage the rack-teeth, and a spring connecting the upper end of the auxiliary lever with the brake-lever, substantially as described.

In testimony whereof I affix my signature in presence of two witnesses.

AUGUST WEISENHORN.

Witnesses:
RICHARD LOCKEY,
J. MILLER SMITH.